May 5, 1964   L. R. ST. CLAIR   3,131,962
TRAILERS
Filed Oct. 11, 1961

Lonnie R. St Clair
INVENTOR.

BY

ATTORNEY

United States Patent Office 3,131,962
Patented May 5, 1964

3,131,962
TRAILERS
Lonnie R. St. Clair, Lubbock, Tex., assignor to Strong Trailer and Supply Co., Inc., Lubbock, Tex., a corporation of Texas
Filed Oct. 11, 1961, Ser. No. 144,369
3 Claims. (Cl. 296—3)

This invention relates to trailers and more particularly to farm trailers which are towed behind harvesting machines.

In harvesting agricultural crops such as cotton, it is customary to tow a trailer in which is placed the harvested crop. Specifically discussing a cotton harvesting operation wherein the cotton is stripped from the plant, the trailer used behind the machine is a four-wheel wagon-type trailer with high sideboards and a high tail gate. The front-end gate is low, often less than half the height of the sideboards, so that the elevating mechanism of the harvesting equipment will clear the front as it projects over the front of the trailer. Also, the front of the sideboards slopes backward from the top of the front-end gate to the top of the sideboards.

This arrangement is entirely satisfactory for the purpose intended, i.e. the harvesting of the crop. However, structurally, it has the fault that the point where the sideboards begin sloping backward from the top of the front-end gate is weak.

I have designed a trailer which provides the necessary clearance for the elevating mechanism of the harvesting equipment, yet provides a structurally strong sideboard. I do this by having the forward stake of the sideboard extend from the forward upper corner of the sideboard to the bottom where it is securely fastened to the floorboard unit, the same as the other stakes of the sideboard unit.

An object of the invention is to provide an agricultural trailer adapted to be towed by agricultural harvesting equipment.

Further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawings, the different views of which are not necessarily to the same scale, in which.

Figure 1:
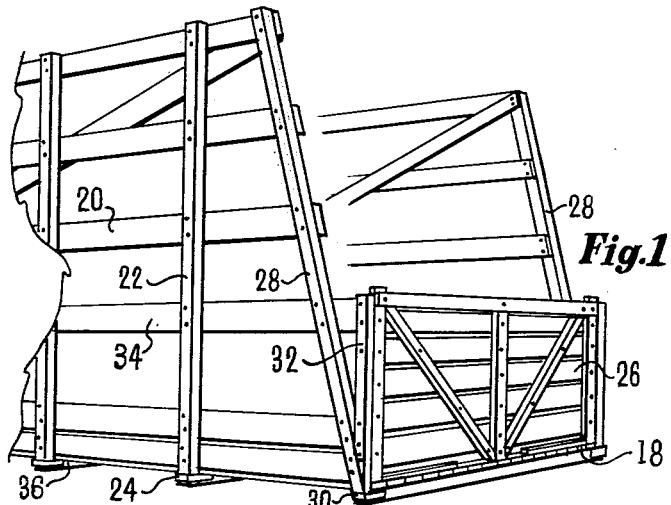
FIG. 1 is a partial perspective of the front of a trailer according to this invention.

As may be seen in the accompanying drawings, this trailer has a plurality of wheels 10 which are connected together by frame 12. The front wheels are connected to tongue 14 by which the trailer may be connected to a towing vehicle (not shown). The frame includes runners 16 which extend lengthwise of the trailer and form lengthwise support for floorboard unit 18 of the trailer.

Sideboards 20 are of generally rectangular shape, except at the forward edge where they angle backward. A plurality of stakes 22 extend upright along the side of the sideboards 20 and form a principal structural support thereof. The bottom of stakes 22 extends through metal loops 24 which are attached to the floorboard unit 18. The sideboards are enclosed with wire mesh so that they will contain the cotton or other agricultural product which is placed in the trailer. In some constructions the stakes 22 will be connected with wood slatting rather than wire mesh; however, this is immaterial to the purpose of this invention.

The forward stake or straight structural member 28 is connected at the forward edge of the floorboard unit 18 with metal loop 30. It extends in a general upright direction; however, it angles rearward from true vertical. The front-end gate 26 extends vertically upward from the front edge of the floorboard unit 18. The sideboard 20 has a vertical structural member 32 which extends vertically upward from the lower forward corner of the sideboard and which provides means for attaching the front-end gate 26. From the top of the vertical structural member 32 there is attached an horizontal structural member 34 which extends the length of the sideboard. It is also attached to the forward stake 28 at the point of intersection. As may be seen, the forward stake 28 is attached to the sideboard unit 20 from top to bottom as by nailing or by bolts.

As may be seen there are two basic types of floorboard units 18 which are commonly employed. One type (FIGS. 1 and 2) employs a plurality of cross members 36 which are attached above the runners 16. The cross members 36 extend from one side of the floorboard unit to the other. Then longitudinal floorboards which extend the length of the trailer are attached on top of these cross members 36. In such an installation the metal loops 24 are attached to the ends of the cross members 36.

Figure 3:
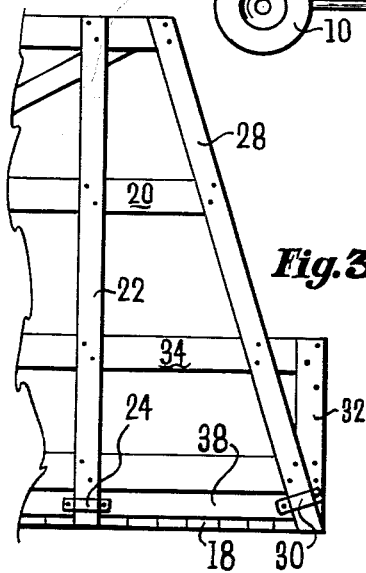
FIG. 3 is a partial elevational view of the front of a trailer according to this invention, the floorboard construction being slightly different from the embodiment shown in FIG. 2.

The other basic type (FIG. 3) of floorboard unit has heavy cross floorboards, and they are attached crosswise for the length of the trailer atop the runners 16. In such a case, a longitudinal structural member 38 is attached immediately above the floorboards proper, and the metal loops 24 are attached to this longitudinal structural member.

It will be understood that the metal loops 24 and 30 form means for strapping the stakes 22 and 28 to the floorboard unit 18.

Figure 2:
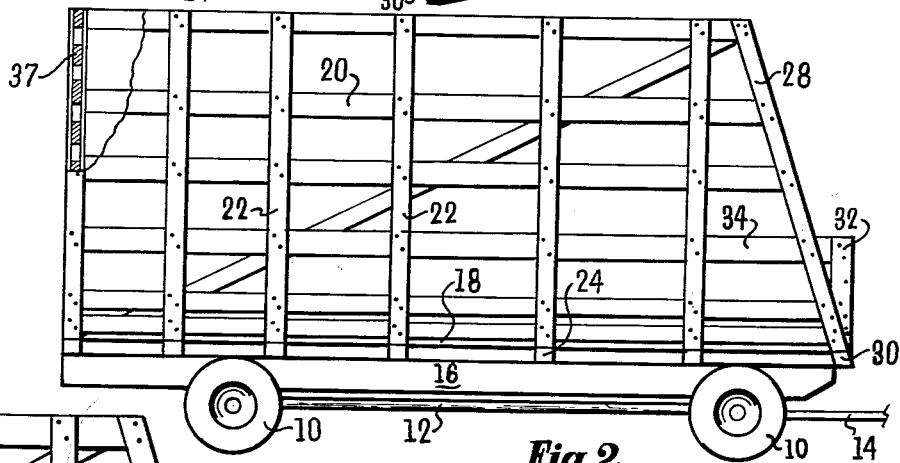
FIG. 2 is an elevational view of the trailer shown in FIG. 1.

Tail gate 37 is on the opposite end of the trailer from front end gate 26 as may be seen in FIG. 2.

It will be apparent that the embodiments shown are only exemplary and that various modifications can be made in construction, materials, and arrangement within the scope of the invention as defined in the appended claims.

I claim as my invention:
1. In a trailer body
   (a) mounted on a trailer frame
   (b) which connects a plurality of wheels together,
   (c) the body including a floorboard unit,
   (d) a front-end gate,
   (e) a tail gate, and
   (f) side boards;
      the improvement comprising:
   (g) a straight structural member extending along the forward edge of the upper portion of each sideboard,
   (h) the structural member angling rearward as does the forward edge, and
   (i) the structural member extending to and securely fastened to the floorboard unit.
2. In a trailer body
   (a) mounted on a trailer frame
   (b) which attaches a plurality of wheels together,
   (c) a floorboard unit on the frame,
   (d) sideboards,
   (e) tail gate, and
   (f) front-end gate extending upward from the floorboard unit; and
   (g) the top of the front of each sideboard angling rearwardly;
      the improvement comprising:
   (h) a straight structural member extending along and defining the front which angles rearwardly at the top of each sideboard, (i) said structural member attached securely to the front of the floorboard unit, (j) the front-end gate extending vertically upward from the front of the floorboard unit, and (k) a horizontal structural member extending the length of the sideboards extending from the top of the front-end gate and also attached to said first mentioned structural member.

3. In a trailer body
(a) mounted on a trailer frame
(b) which connects a plurality of wheels together,
(c) a floorboard unit on the frame,
(d) sideboards with
(e) the forward edge of the upper portion of each sideboard unit angling rearward,
(f) a tail gate, and
(g) a front-end gate extending upward from the floorboard;
  the improvement comprising:

(h) a straight structural member for each sideboard
(i) extending the full height of each sideboard,
(j) each of the structural members angling rearward,
(k) each of the structural members defining and extending along the forward edge of the angling upper portion of each sideboard, and
(l) attached to the forward edge of the angling upper portion and
(m) attached to the sideboard below the angling upper portion.

References Cited in the file of this patent
UNITED STATES PATENTS

| | | |
|---|---|---|
| 594,621 | Hartsell | Nov. 30, 1897 |
| 993,879 | Rodebaugh | May 30, 1911 |
| 1,031,068 | Hays | July 2, 1912 |

OTHER REFERENCES

Country Gentleman, publications, February 1950, (Page 45 relied on.)